July 9, 1968  F. W. HILLMANN  3,392,244

SAFETY TROLLEY DUCT AND CARRIAGE FOR SAME

Filed July 26, 1965  2 Sheets-Sheet 1

INVENTOR.
FRIEDRICH W. HILLMANN
BY
Richard H. MacCutcheon
ATTORNEY

' # United States Patent Office 3,392,244
Patented July 9, 1968

3,392,244
SAFETY TROLLEY DUCT AND CARRIAGE FOR SAME
Friedrich W. Hillmann, Kamen, Germany, assignor to Paul Vahle KG, Kamen, Germany, a corporation of Germany
Filed July 26, 1965, Ser. No. 474,663
4 Claims. (Cl. 191—23)

ABSTRACT OF THE DISCLOSURE

A safety trolley duct which is a plastic housing (10) having integrally formed plastic top, side wall and spaced bottom portions. The bottom portions form tracks for support wheels (13) of a carriage while the side wall portions have inwardly extending dovetail profiles (18) supporting copper conductors (19) contacted by collector brushes (20) on the carriage.

---

This invention relates to enclosed power conductor systems of the type adapted to make electrical contact for linearly movable current collecting carriages, for example for supplying power for hoists, light cranes, hand tools, and other movable machinery.

It has been known heretofore to have metal track for the wheels of a current collecting carriage enclosed by a stationary protective housing having a box-like cross section and at the bottom a longitudinal slot. In most cases the protective housing has been made of metal sheet, and then the line conductors or slide rails have had to be mounted on insulators in order to insulate against ground and/or between individual phases or polarities. Additionally, in the past, it has been necessary to protect the metal sheet of the protective housing against corrosion by galvanizing, or by painting it.

Further, whatever the housing may be made of, there have been problems in the past in that the current collecting brushes of the collector carriage jump from the live rails when pulled one way or the other without proper support and guidance of the carriage.

It is an object of the present invention to provide simple means for overcoming the above mentioned difficulties.

Another object is to provide safe, shock proof, electrically inert means for housing a trolley carriage while supporting it against unwanted lateral and tilting movements and also assuring that carriage and its housing occupy minimal dimensions, thus reducing costs.

Other objects and advantages will become apparent and the invention may be better understood from consideration of the following description taken in connection with the accompanying drawing, in which.

Figure 1:
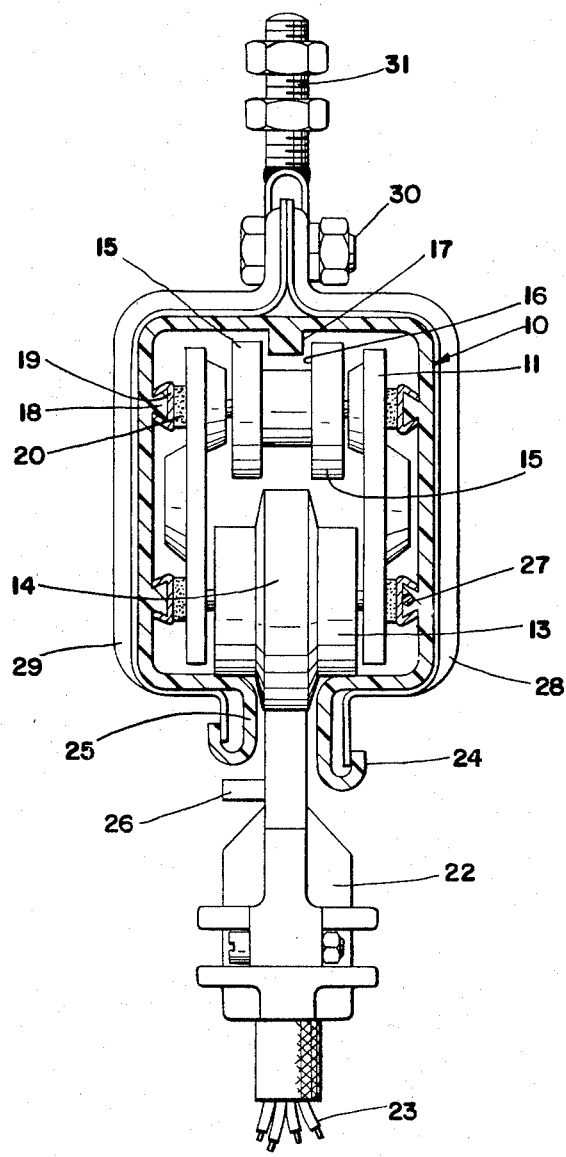
FIG. 1 shows a transverse section through a duct housing, and an end view of a current collecting trolley carriage, and an end view of one of assumed plural reinforcing and/or mounting clamps.
Figure 2:
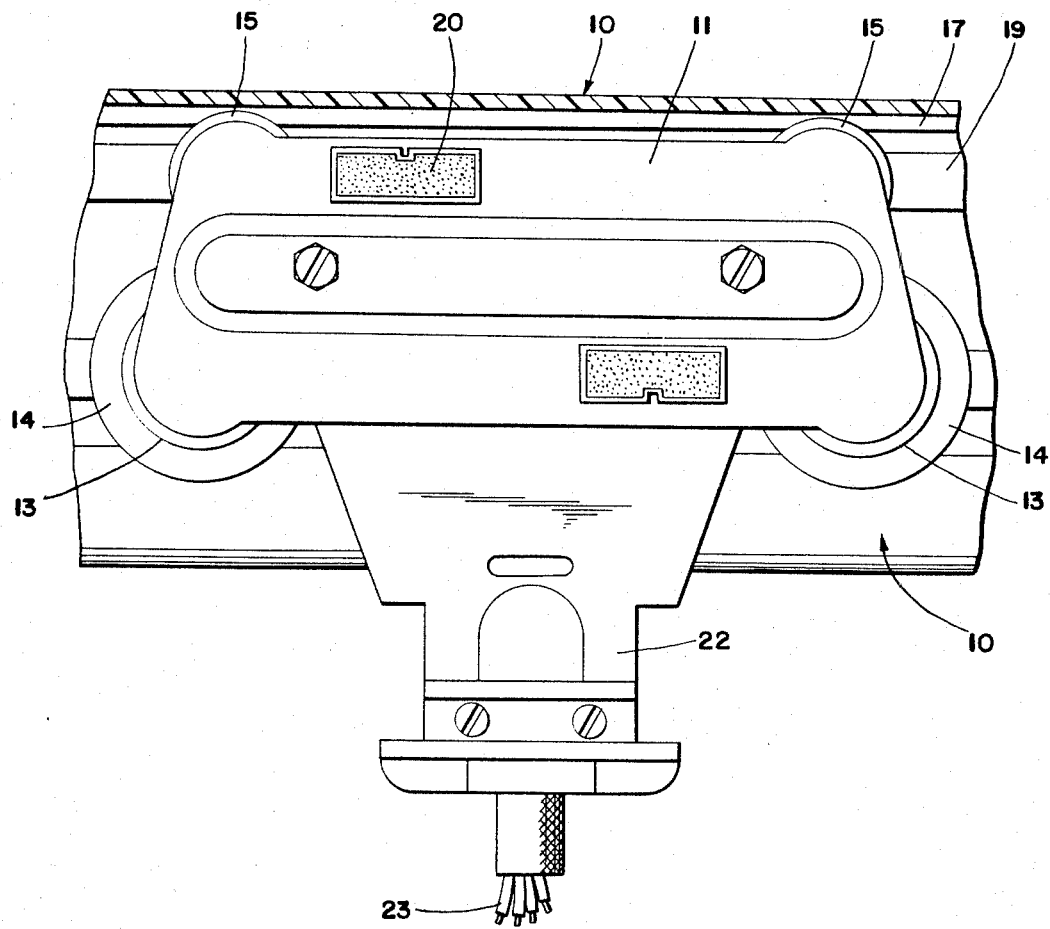
FIG. 2 is a longitudinal section through the housing and a lateral view of the current collecting carriage of FIG. 1.

In the past it has been suggested to provide roller wheels for a current collector carriage with all such wheels located in the same vertical plane at one side of the carriage. But this results in uneven load, and impedes free movement of the current collector carriage, and results in increased wear of both stationary and relatively slideable or rotatable members. According to one aspect of the present invention there is provided, instead, an arrangement of carriage roller wheels located equally on each side of each axis of symmetry of a current collecting carriage, a runway and guideway for lower sets of wheels and flanges being formed by inner faces of lower housing walls and inner faces of lower flanges depending therefrom, while a runway and guideway for an upper set or sets of roller wheels is formed by a lip or flange which is provided on the bottom face of the top of the housing which lip is adapted to be embraced by radial faces of the upper roller wheels. Thus all turning moments that might otherwise occur in the current collector carriage are avoided.

Referring now to the drawings, an elongated box-like housing indicated generally at 10 is preferably of an in-insulating thermoplastic material such as polyvinyl chloride or nylon. The plastic material housing 10, except that it is integral as shown, is in the form of the profile of two U's, lying on their sides and facing each other with their open ends while the U's terminate in flanges 17, 24, 25 downwardly depending at the top of the structure and downwardly depending at the bottom of the structure, which flanges serve as carriage wheel guideways. The housing encloses a carriage having side members 11 supporting conventional bearings (not shown) and axles which in turn carry four carriage weight supporting wheels 13 and two wheel-like flanges 14 which are larger than said weight supporting wheels and which are mounted one between each pair of support wheels having a common axle.

The carriage is also provided with four upper running wheels 15 having inner wheel flanges 16 with which they embrace a central lip 17 provided on the inner side of the top of the housing 10, thus to prevent serious lateral tilting of the current collecting carriage. The provision of duplicate wheel assemblies, one at each end of the carriage, also serves to avoid the effect of longitudinal tilting moments released by pressure as the carriage is moved, in one direction or the other, or brought to a sudden stop.

As shown in FIG. 1 side walls which depend from the top of the housing are provided with inwardly extending dovetail profiles 18, and pushed thereover are appropriately shaped copper conductors or slide lines 19. Preferably there are two or more such profiles, and a corresponding number of conductors, four being shown in the drawing, e.g., for three phase lines and ground. If it is desired to have five slide lines, for example for three phase connections and two control circuit connections, projection 17 could be appropriately faced with a conductive material to provide the fifth position. Mating with as many slide line positions as are used, are conventional spring biased carbon brushes 20 mounted in recesses provided in the sides 11 of the carriage, such sides being assumed, and preferably of, an insulating plastic material provided, for example, by a molding process. Depending from the main body of the current collecting carriage is a driving element 22 which may also serve to support the weight of machinery powered by the trolley duct system. Extending downward through the driving element 22 are individual conductors which terminate in cabled wires 23.

As already intimated, the weight supporting wheels 13 have a central wheel flange 14 which traverses an elongated slot provided by bottom portions of the housing. As illustrated in FIG. 1 the right side bottom portion of the housing 10 terminates as a downwardly directed bent over angular flange 24 which is longer than that of an otherwise similar angular flange 25 depending from the left side bottom portion. By this asymmetry of the housing, together with appropriate design of the current collecting carriage, as shown by providing a projecting flange 26, it is assured that the current collecting carriage will not be improperly introduced in such manner as to provide wrong polarities or phasing.

Most conveniently the housing is put up in sections. At the interface between sections, electrical continuity of the slide rails may be assured by inserting toy train type pins, as indicated at 27 in FIG. 1, in suitable slots provided in the dovetail profiles, and the joint may be reinforced by a clamp comprising two clips 28, 29 which may, for example, be about 6″ long and 4½″ high and fastened at their tops by bolt means 30. Intermediate the length of a section, like, or different, reinforcing clamps, and hence the whole trolley duct and carriage assembly, may be supported by suspension bolts 31, attached to a building roof (not shown) or to brackets along the runway of moving machinery.

There is thus provided apparatus of the class described capable of meeting the objects above set forth while providing good wear characteristics, greater universality, and the avoidance of multiple trolley installations for three or four or five or more conductor line applications.

The strength of the insulating material housing 10 need not be great because it is reinforced by the metal clips 28, 29 embracing the housing almost as far as the lower angular flanges 24, 25. The housing offers the advantage that neither rain water nor other liquid will readily penetrate into it, that it is corrosion proof and needs no galvanizing, painting, or varnishing, and is safe. Further, since neither the current carrying tracks nor the weight supporting "tracks" need be mounted on insulators, the housing may be proportionally narrow, and low, while still having appropriately high leakage resistance values because of the relatively large dimensions between phases or polarities, so that even as much as 500 volts, A.C. or D.C., will not result in flash-over from phase to phase or from one potential to ground. Additionally, the longitudinal opening for the collector trolley may readily be made as small as one-half inch to prevent most any adult from accidentally touching live conductors.

While a particular embodiment has been illustrated and described, various modifications may obviously be made without departing from the true spirit and scope of the invention which is intended to be defined by the appended claims taken with all reasonable equivalents.

I claim:
1. Trolley duct comprising a thermoplastic material housing in the form of the profile of two U's, lying on their sides and facing each other with their open ends while the U's terminate in flanges downwardly depending at the bottom of the structure and downwardly depending at the top of the structure, which flanges serve as carriage wheel guideways.

2. A trolley and safety trolley duct system comprising:
a current collector carriage which has:
fore and aft weight supporting axles,
four carriage weight supporting wheels mounted respectively by pairs upon said axles,
at least one wheel-like flange which is larger than said weight supporting wheels and which is mounted between wheels of a pair having a common axle,
at least one upper axle,
at least one upper pair of wheels which are spaced apart while mounted upon said upper axle,
at least two brushes which are mounted in the sides of said carriage for current collection,
a trolley duct comprising a housing which forms:
a housing top having a downwardly projecting lip which serves as a guide for said carriage upper pair of wheels,
housing sides which carry conductors for engagement with said brushes,
housing bottom portions whose upwardly facing surfaces serve as runway for said carriage weight supporting wheels,
a pair of flanges downwardly depending from the inner ends of said housing bottom portions and serving by the spacing between themselves as a guideway for said wheel-like flange.

3. A trolley as in claim 2 further characterized by the wheels of the carriage being of a thermoplastic material.

4. Trolley duct as in claim 2 further characterized by the two downwardly depending bottom flanges being asymmetric, one extending further downward than the other, and there being a carriage having wheels for supporting and guiding the carriage within said trolley duct while said carriage has a projecting means cooperable with said downwardly depending bottom flanges to prevent wrong way insertion of the trolley in the duct.

References Cited

UNITED STATES PATENTS

| | | | |
|---|---|---|---|
| 442,508 | 12/1890 | Boynton | 105—147 X |
| 876,489 | 1/1908 | Rappleye et al. | 191—30 X |
| 1,372,761 | 3/1921 | McBride | 105—155 X |
| 1,428,613 | 9/1922 | Simpson | 105—155 |
| 1,739,591 | 12/1929 | Holzel | 191—30 |
| 2,018,846 | 10/1935 | Frank et al. | 191—23 |
| 2,026,884 | 1/1936 | Glasgow | 191—23 |
| 2,132,022 | 10/1938 | Frank et al. | |
| 2,254,142 | 8/1941 | Glasgow | 191—45 |
| 2,882,356 | 4/1959 | Davis et al. | 191—23 |
| 2,918,540 | 12/1959 | Mayer | 191—23 |
| 2,921,146 | 1/1960 | Ericson | 191—23 X |

FOREIGN PATENTS 1,217,532 12/1959 France.

ARTHUR L. LA POINT, *Primary Examiner.*

STANLEY T. KRAWCZEWICZ, *Assistant Examiner.*